US012722790B2

(12) United States Patent
Lewis

(10) Patent No.: US 12,722,790 B2
(45) Date of Patent: Sep. 1, 2026

(54) AIRCRAFT ENGINE WARNING SYSTEM AND METHOD

(71) Applicant: Textron Innovations Inc., Providence, RI (US)

(72) Inventor: Barbara Lewis, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 336 days.

(21) Appl. No.: 18/069,326

(22) Filed: Dec. 21, 2022

(65) Prior Publication Data

US 2024/0208667 A1 Jun. 27, 2024

(51) Int. Cl.
*B64D 31/00* (2024.01)
*B64C 27/00* (2006.01)
*B64D 45/00* (2006.01)
*B64F 5/60* (2017.01)

(52) U.S. Cl.
CPC ............. *B64D 31/00* (2013.01); *B64D 45/00* (2013.01); *B64F 5/60* (2017.01); *B64C 27/00* (2013.01)

(58) Field of Classification Search
CPC ........ B64D 45/00; B64D 31/00; B64D 43/00; B64F 5/60; B64C 27/00
See application file for complete search history.

(56) References Cited

U.S. PATENT DOCUMENTS 7,460,029 B2 * 12/2008 Boorman ................. G01D 7/00 340/975
10,242,582 B1 * 3/2019 Ogden ..................... G08G 5/21
11,046,452 B1 * 6/2021 Viswanatha ........... G02B 27/01
2010/0211237 A1 * 8/2010 Nichols .................... G08G 5/74 701/14
2015/0045989 A1 * 2/2015 Polansky ............... G01C 23/00 701/2
2017/0162062 A1 * 6/2017 Kushwaha ............... G08G 5/55
2019/0161203 A1 * 5/2019 Worsham, II .......... B64D 45/00
2020/0218066 A1 * 7/2020 James ................... G06T 19/006
2021/0122499 A1 * 4/2021 Luobikis ................ G06Q 10/20
2021/0309385 A1 * 10/2021 Quintana ............... B64D 45/00
2022/0097864 A1 * 3/2022 Baladi ..................... F01D 15/10
2023/0021088 A1 * 1/2023 V ........................ G06F 3/04895

OTHER PUBLICATIONS

NTSB, Aviation Investigation Final Report, Jan. 16, 2018, pp. 6, 14, and 16 (This document is the source for Bell document) (Year: 2018).*
Sakthy Sundara Murthy, Little Pilots, "Keys for Airplanes?" (Year: 2021).*

* cited by examiner

*Primary Examiner* — Anne Marie Antonucci
*Assistant Examiner* — Luis G Del Valle
(74) *Attorney, Agent, or Firm* — Slater Matsil, LLP

(57) ABSTRACT

In an embodiment, an apparatus includes: a display; and an engine control panel disposed below the display, the engine control panel including: engine control knobs; and alert indicators above the engine control knobs, the alert indicators including light bulbs that, when turned on, emit light in a single color that does not change, the display capable of rendering more colors than the alert indicators.

20 Claims, 6 Drawing Sheets

AIRCRAFT ENGINE WARNING SYSTEM AND METHOD

BACKGROUND

Aircraft include a propulsion system to generate aerodynamic lift to support the weight of the aircraft in flight, and to generate thrust to move the aircraft in forward flight. For example, a rotorcraft may include rotor systems. Additionally, aircraft include one or more engines powering the propulsion system. Some aircraft include multiple engines, which allows for redundancy in case of an engine outage during flight.

SUMMARY

In an embodiment, an aircraft includes: a plurality of engines; a display, the display being polychromatic; an engine control panel disposed on different surface than the display, the engine control panel including engine control knobs and alert indicators, the alert indicators disposed above the engine control knobs, the alert indicators being monochromatic; and a controller configured to: detect a problem with a first engine of the engines; and provide an alert for the problem with the display and with a first alert indicator of the alert indicators, the first alert indicator being associated with the first engine. In some embodiments of the aircraft, the controller is configured to provide the alert by: rendering the alert with the display using different colors based on a severity of the alert; and illuminating the first alert indicator in a same color regardless of the severity of the alert. In some embodiments of the aircraft, the controller is configured to provide the alert by further: playing an audio alert with an audio system. In some embodiments of the aircraft, the first alert indicator is disposed nearer to a first engine control knob than to others of the engine control knobs, the first engine control knob being associated with the first engine. In some embodiments of the aircraft, the engine control panel further includes engine labels disposed above the engine control knobs. In some embodiments of the aircraft, the alert indicators are disposed above the engine labels. In some embodiments of the aircraft, the alert indicators are disposed below the engine labels.

In an embodiment, an apparatus includes: a display; and an engine control panel disposed below the display, the engine control panel including: engine control knobs; and alert indicators above the engine control knobs, the alert indicators including light bulbs that, when turned on, emit light in a single color that does not change, the display capable of rendering more colors than the alert indicators. In some embodiments of the apparatus, the engine control knobs are crank-off-start/idle-fly (COSIF) control knobs. In some embodiments of the apparatus, the light bulbs are light-emitting diodes. In some embodiments of the apparatus, the light bulbs, when turned on, emit white light. In some embodiments of the apparatus, the engine control panel further includes: engine labels above the alert indicators. In some embodiments of the apparatus, the engine control panel further includes: engine labels below the alert indicators.

In an embodiment, a method includes: detecting a problem with an engine of an aircraft; providing an alert for the problem by: rendering text on a color display of the aircraft using different colors based on a severity of the alert; and illuminating an alert indicator of the aircraft in a same color regardless of the severity of the alert, the alert indicator associated with the engine; and receiving input from an engine control knob associated with the engine; and transmitting a control signal to the engine. In some embodiments of the method, providing the alert for the problem further includes: playing an audio alert with an audio system of the aircraft. In some embodiments of the method, the text is rendered in black when the alert is an advisory alert, the text is rendered in yellow when the alert is a cautionary alert, and the text is rendered in red when the alert is a critical alert. In some embodiments of the method, the alert indicator is illuminated in white when the alert is an advisory alert, the alert indicator is illuminated in white when the alert is a cautionary alert, and the alert indicator is illuminated in white when the alert is a critical alert. In some embodiments of the method, the engine control knob is one of a plurality of engine control knobs, and the alert indicator is disposed nearer to the engine control knob than to others of the engine control knobs. In some embodiments of the method, the color display is disposed on a different surface of a cockpit of the aircraft than the alert indicator. In some embodiments of the method, the alert indicator is one of a plurality of alert indicators, and the method further includes: before operation of the aircraft, testing the alert indicators by illuminating each of the alert indicators for a predetermined duration of time.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

According to various embodiments, an instrument panel for an aircraft includes control panels and displays. The control panels include an engine control panel, which includes alert indicators. An alert for an engine problem is provided using both the displays and the alert indicators. The displays are polychromatic, and are adapted to provide the alert with color-coding based on the severity of the alert. The alert indicators are monochromatic, and are adapted to provide the alert in a same color regardless of the severity of the alert. Each engine's indicator is located near a corresponding control knob for that engine on the engine control panel. Physically locating an alert indicator near its corresponding engine control knob provides a mental link for the crew when turning off an engine, which may reduce the risk of crew errors. For example the risk of the crew turning off the wrong engine may be reduced.

Figure 1:
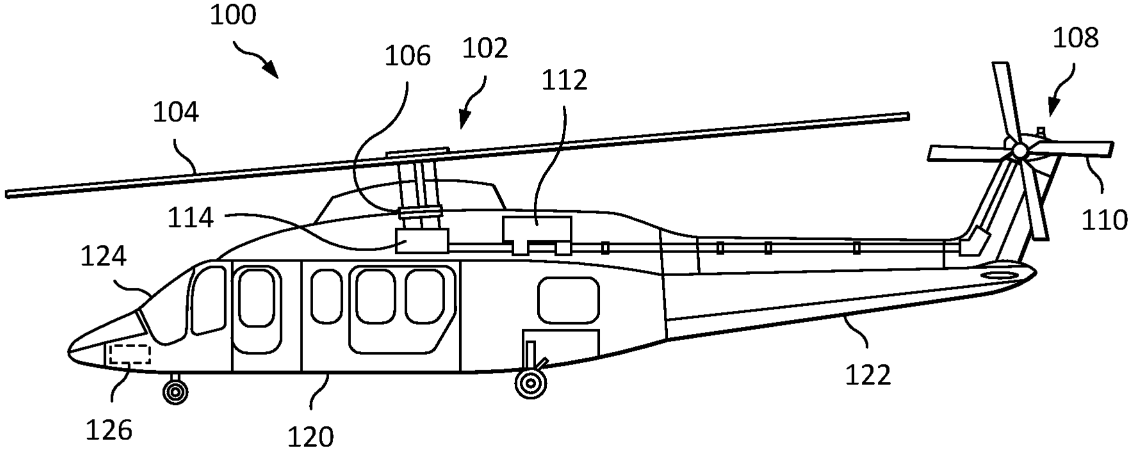
FIG. 1 illustrates a rotorcraft, according to some embodiments.

FIG. 1 illustrates a rotorcraft 100, according to some embodiments. In this embodiment, the rotorcraft 100 is a helicopter. It should be appreciated that some teachings regarding the rotorcraft 100 may apply to aircraft other than helicopters, such as airplanes, tilt rotor aircraft, and the like. Further, although the rotorcraft 100 is depicted as including certain illustrated features, it should be appreciated that the rotorcraft 100 may have a variety of implementation-specific configurations.

The rotorcraft 100 includes a main rotor system 102, which includes a plurality of main rotor blades 104. The pitch of each main rotor blade 104 may be controlled by a swashplate 106 in order to selectively control the attitude, altitude, and movement of the rotorcraft 100. The swashplate 106 may be used to collectively and/or cyclically change the pitch of the main rotor blades 104. The swashplate 106 may be controlled by one or more main rotor actuators. The rotorcraft 100 also includes an anti-torque system, which may include a tail rotor system 108, no-tail-rotor (NOTAR), or a dual main rotor system. In rotorcraft with a tail rotor system 108, the pitch of each tail rotor blade 110 is collectively changed in order to vary thrust of the anti-torque system, providing directional control of the rotorcraft 100. The pitch of the tail rotor blades 110 is changed by one or more tail rotor actuators.

Power is supplied to the main rotor system 102 and the anti-torque system by a plurality of engines 112. Multiple engines 112 are utilized to increase redundancy of the power train system for the rotorcraft 100. The engines 112 may include engine control computers for controlling the engines 112. The output of the engines 112 may be provided to the main rotor system 102 and the anti-torque system (e.g., the tail rotor system 108) through a main rotor transmission 114 and a tail rotor transmission (not separately illustrated), respectively. Rotational energy from the multiple engines 112 may be combined at, e.g., the main rotor transmission 114.

The rotorcraft 100 further includes a fuselage 120 and a tail section 122. The tail section 122 may include other flight control devices such as horizontal or vertical stabilizers, rudder, elevators, or other control or stabilizing surfaces that are used to control or stabilize flight of the rotorcraft 100.

The fuselage 120 includes a cockpit 124, which includes displays, controls, and instruments.

The rotorcraft 100 further includes a rotorcraft controller 126 that is operable to control the rotorcraft 100. For example, the rotorcraft controller 126 can transmit control signals (e.g., commands) to the engine control computers, the main rotor actuators, the tail rotor actuators, or the like to control flight of the rotorcraft 100. The rotorcraft controller 126 may include any acceptable circuit, computer, state machine, or the like. For example, the rotorcraft controller 126 may include one or more processors and memories, such as non-transitory computer readable storage mediums, that store programming for execution by the processors. In some embodiments, the rotorcraft 100 is a fly-by-wire (FBW) rotorcraft, and the rotorcraft controller 126 includes flight control computers (FCCs) operable to execute one or more control laws (CLAWS) that control flight of the rotorcraft 100. Additionally, the rotorcraft controller 126 may be operable to perform sensor data collection and analysis as part of a health and usage monitoring system (HUMS), a flight control system, a sensor system, a monitoring system, or the like. One or more modules within the rotorcraft controller 126 may be partially or wholly embodied as software and/or hardware for performing any functionality described herein.

Figure 2:
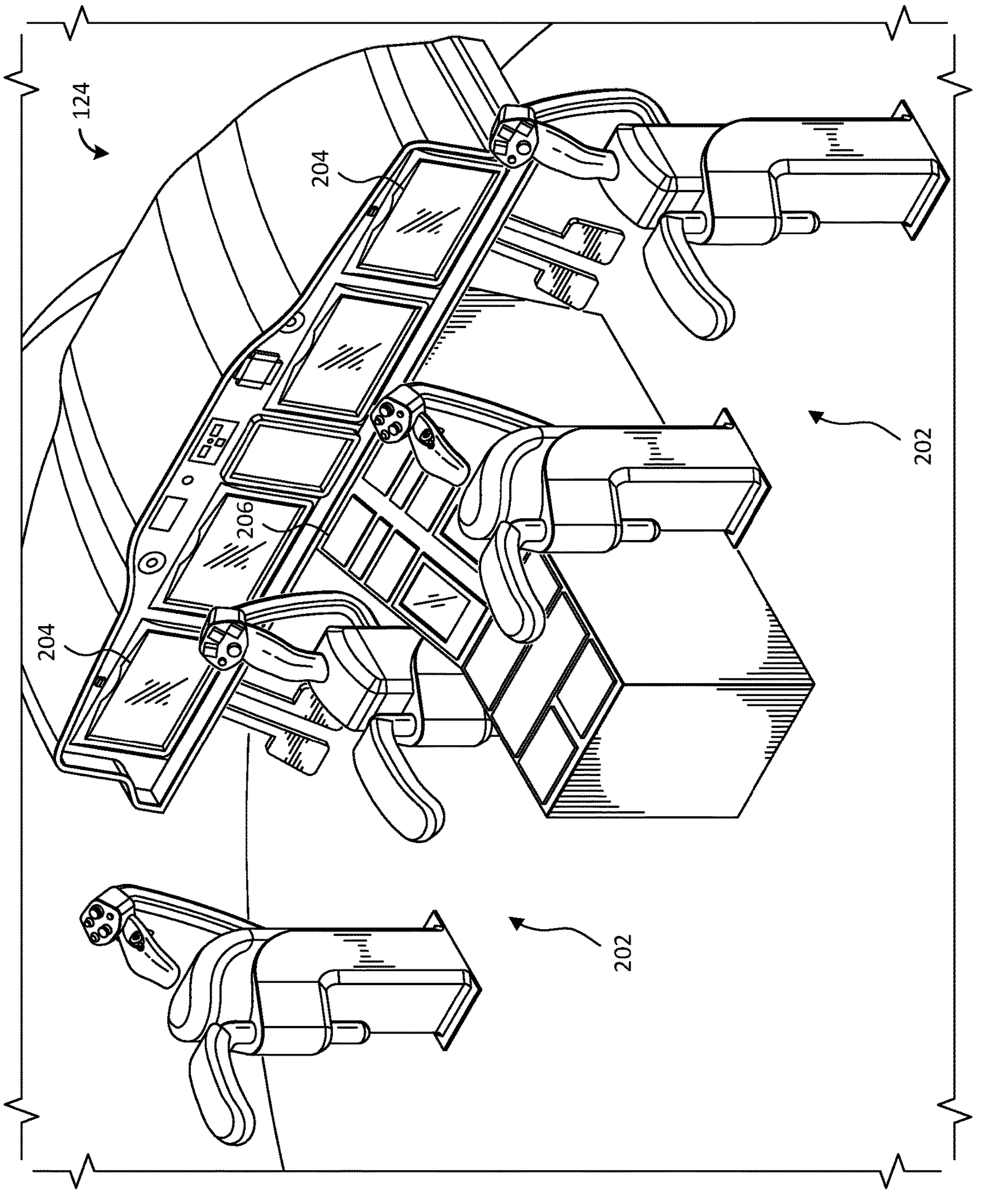
FIG. 2 illustrates the inside of a rotorcraft cockpit, according to some embodiments.

FIG. 2 illustrates the inside of the cockpit 124, according to some embodiments. The cockpit 124 includes one or more pilot flight controls 202, which may be manipulated in order to control flight of the rotorcraft 100. The pilot flight controls 202 may include a cyclic stick, a collective stick, pedals, and the like. In embodiments where the rotorcraft 100 is a fly-by-wire rotorcraft, the rotorcraft controller 126 (see FIG. 1) may analyze input signals from the pilot flight controls 202 and dispatch corresponding control signals to flight control devices, such as the main rotor actuators, the tail rotor actuators, or the like.

Additionally, the cockpit 124 includes an instrument panel, which may include displays 204 and control panels 206. The displays 204 may be used to provide information about the various systems of the rotorcraft 100 to the crew. The displays 204 are polychromatic displays capable of displaying multiple colors, such as liquid crystal displays (LCDs), organic light-emitting diode (OLED) displays, or the like. In an embodiment, the displays 204 are part of a Garmin® G5000H™ or the like. In some embodiments, the rotorcraft controller 126 (see FIG. 1) may output information to the displays 204. The control panels 206 may be manipulated in order to control various systems of the rotorcraft 100. The control panels 206 may include buttons, keys, switches, knobs, interface features on a touchscreen, or the like. In some embodiments, the rotorcraft controller 126 (see FIG. 1) may analyze input signals from the control panels 206 and dispatch corresponding control signals to components of the rotorcraft 100, such as the engine control computers or the like. As subsequently described in greater detail, the control panels 206 include an engine control panel for controlling the engine control computers of the engines 112 (see FIG. 1).

During operation of the rotorcraft 100, engine alerts may be provided to the crew regarding the status of the engines 112. An engine alert is a caution (or warning, or advisory) provided to the crew when a problem is detected with a particular engine 112. In some embodiments, an engine alert may be provided to the crew when an engine control unit for an engine 112 fails, when excessive metal chips are detected in an engine 112, when the fuel supply to an engine 112 is low, when a fire is detected in an engine 112, or the like.

Engine alerts have varying degrees of severity. Some engine alerts may be advisory engine alerts, notifying the crew of a change in status of an engine 112 that does not need immediate response. Some engine alerts may be cautionary engine alerts, notifying the crew of an irregularity with an engine 112 that falls short of an engine failure. Some engine alerts may be critical engine alerts, notifying the crew that an engine 112 has failed or is at risk of imminent failure.

The displays 204 are used to provide an engine alert to the crew. Specifically, the displays 204 are adapted to provide the full details of an engine alert, such as what problem was detected, which engine 112 the problem was detected with, and the severity of the problem. Because the displays 204 are color displays, they may provide the severity using color-coding. In some embodiments, the displays 204 may be used to provide advisory engine alerts in black, to provide cautionary engine alerts in yellow, and to provide critical engine alerts in red. For example, an engine alert indicating a failure of an engine control computer for a first engine 112 may be provided with the displays 204 by rendering "ECU 1 FAIL" in red.

As previously noted, multiple engines 112 are utilized to increase redundancy of the power train system for the rotorcraft 100. When a problem is detected with an engine 112, the crew may respond by using the engine control panel 206 to shut down the problematic engine 112. Shutting down an engine 112 may include turning the engine 112 to idle or turning the engine 112 off. For example, if a fire is detected in an engine 112, the problematic engine 112 may be turned off in an effort to extinguish the fire. When an engine 112 is shut down, the other engine(s) 112 of the rotorcraft 100 may continue providing power to the rotorcraft 100.

As demonstrated in FIG. 2, the displays 204 are disposed on different surfaces of the cockpit 124 than the control panels 206. Specifically, the control panels 206 are disposed below the displays 204. For example, the displays 204 may be within a primary field of view of the crew while some of the control panels 206 are within a secondary field of view of the crew. Absent additional indicators, the visual and spatial disconnect between the displays 204 and the control panels 206 may induce crew errors when attempting to shut down a problematic engine 112. These crew errors may include shutting down the wrong (e.g., working) engine 112, thereby leaving the rotorcraft 100 without a working engine 112. Crews are particularly prone to shutting down the wrong engine 112 in response to some types of engine problems, such as high-side engine failures. As subsequently described in greater detail, the engine control panel 206 includes additional alert indicators to provide an engine alert when a problem is detected with an engine 112, which may reduce crew errors as compared to providing an engine alert solely with the displays 204.

Figure 3:
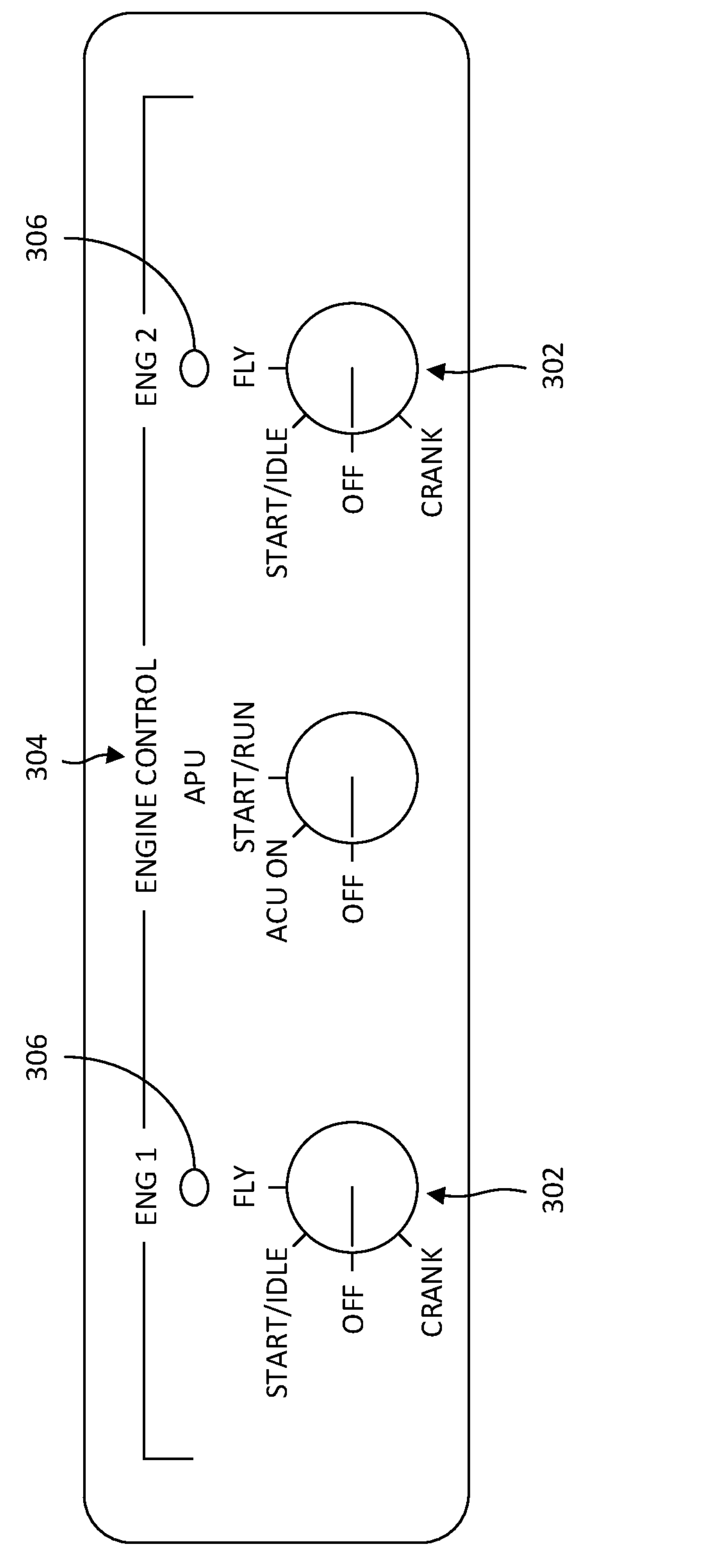
FIG. 3 illustrates an engine control panel, according to some embodiments.

FIG. 3 illustrates a portion of an engine control panel 206, according to some embodiments. The engine control panel 206 includes engine control knobs 302 and engine labels 304. Each engine control knob 302 is associated with and adapted to control a corresponding engine 112. The engine control knobs 302 may be set to one of several discrete positions. In some embodiments, the engine control knobs 302 are crank-off-start/idle-fly (COSIF) control knobs, which may be placed in one of a crank position, an off position, a start/idle position, or a fly position. Each engine label 304 is for a corresponding engine 112. The engine label 304 for an engine 112 is placed above the engine control knob 302 for that engine 112. The engine labels 304 may be printed on the face of the engine control panel 206.

The engine control panel 206 further includes alert indicators 306. The alert indicators 306 are monochromatic indicators capable of displaying a single color, such as light bulbs, such as light-emitting diodes, incandescent bulbs, or the like. As a result the displays 204 are capable of rendering (and are adapted to render) more colors than the alert indicators 306. Each alert indicator 306 is associated with a corresponding engine 112. When a problem is detected with an engine 112, an engine alert is provided by turning on (e.g., illuminating) the alert indicator 306 for that engine 112. The engine alert is provided with the alert indicator 306 in addition to the displays 204 (see FIG. 2). The alert indicators 306 act as redundant indicators when the crew shuts down an engine 112. Increasing the indication redundancy may reduce the risk of the crew errors, such as shutting down the wrong engine 112 during a high-stress situation.

The alert indicators 306, when on, emit light in a single color that does not change. In some embodiments, the alert indicators 306 are white light-emitting diodes. White may be advantageous over other colors. For example, white light is visible with night-vision goggles, while other colors may not be visible with night-vision goggles (or at least, may be less visible than white). Unlike the displays 204 (which are polychromatic), the alert indicator 306 are monochromatic, and therefore the engine alerts provided with the alert indicators 306 are color-independent, e.g., are not color-coded. Accordingly, an alert indicator 306 is illuminated in the same color regardless of the severity of an engine alert. Avoiding the use of color-coding for the alert indicators 306 may reduce the risk of crew errors during a high-stress situation.

The alert indicator 306 for an engine 112 is placed near the engine control knob 302 for that engine 112. Specifically, an alert indicator 306 is physically located nearer to the engine control knob 302 for the corresponding engine 112 than it is to others of the engine control knobs 302 (e.g., for other engines 112). Physically locating an alert indicator 306 near its corresponding engine control knob 302 provides a mental link for the crew when turning off an engine 112, which may reduce the risk of crew errors.

Additionally, the alert indicator 306 for an engine 112 is placed above the engine control knob 302 for that engine 112. Placing the alert indicators 306 above the engine control knobs 302 helps the alert indicators 306 remain visible when a pilot reaches for an engine control knob 302. Accordingly, multiple pilots may visually confirm the correct engine 112 is being shut down before the engine control knob 302 is moved to the idle or off position. In this embodiment, the alert indicators 306 are placed below the engine labels 304.

Figure 4:
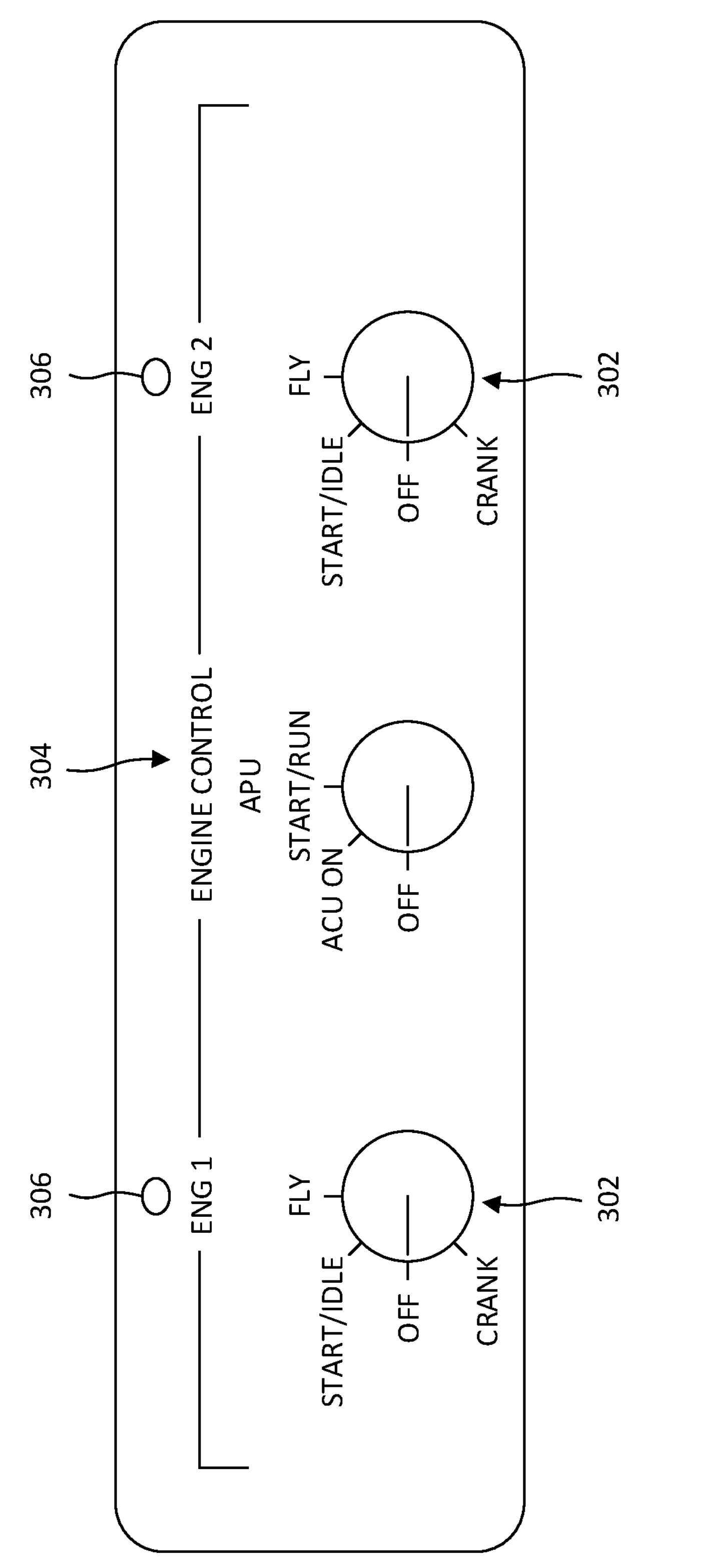
FIG. 4 illustrates an engine control panel, according to some other embodiments.

FIG. 4 illustrates a portion of an engine control panel 206, according to some other embodiments. This embodiment is similar to the embodiment of FIG. 3, except the alert indicators 306 are placed above the engine labels 304. The alert indicators 306 are still placed above the engine control knobs 302.

Figure 5:
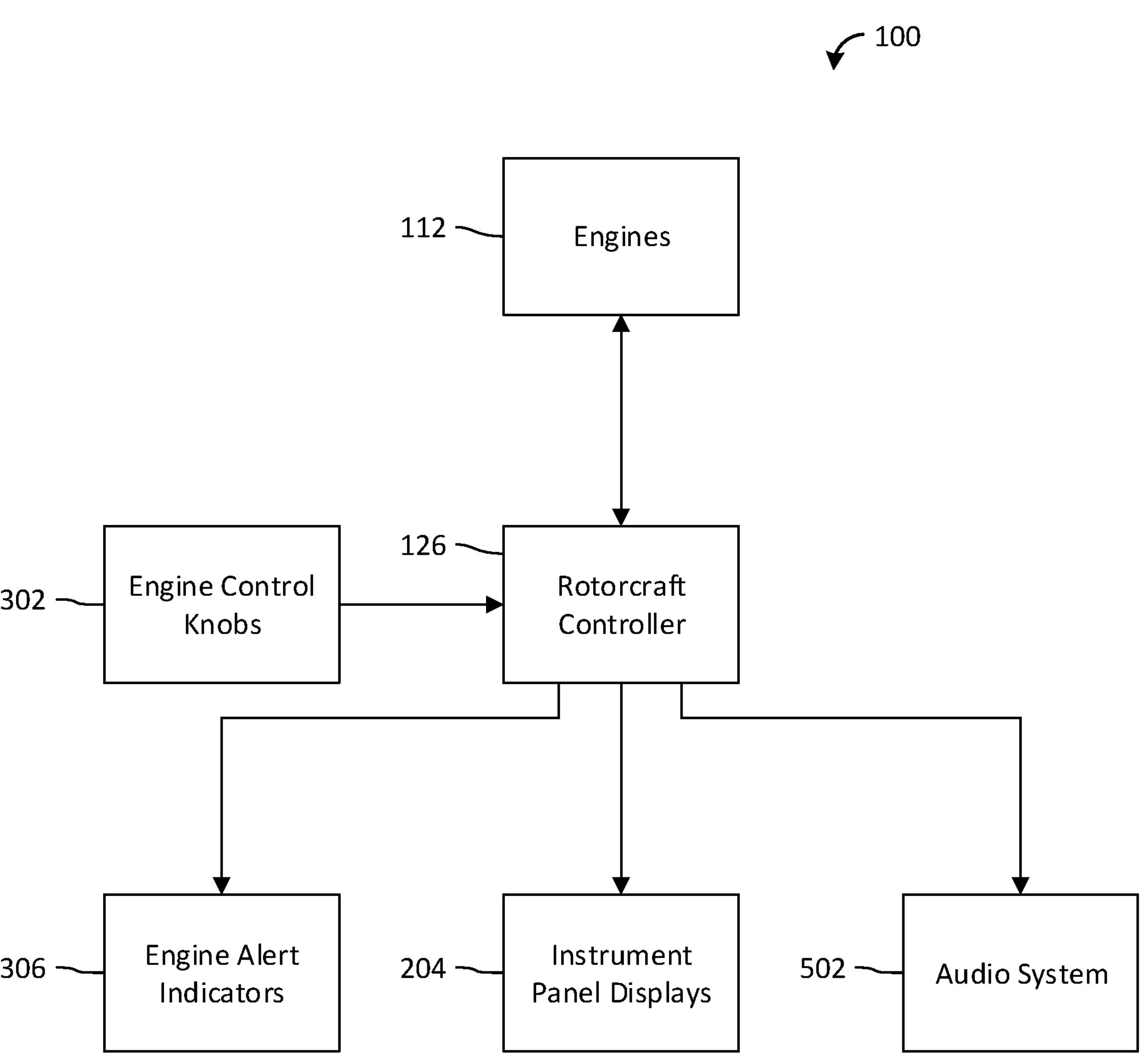
FIG. 5 is a block diagram of aspects of the rotorcraft, according to some embodiments.

FIG. 5 is a block diagram of aspects of the rotorcraft 100, according to some embodiments. Specifically, features for controlling the engines 112 of the rotorcraft 100 are shown. The rotorcraft controller 126 receives input signals from multiple sources, including the engines 112 (e.g., the engine control computers) and the engine control knobs 302. Based on the input signals, the rotorcraft controller 126 transmits display signals to the displays 204 and the alert indicators 306, and also transmits control signals to the engines 112 (e.g., the engine control computers).

In some embodiments, the rotorcraft 100 may include additional components, such as an audio system 502. The audio system 502 may be part of an intercom system for the crew. For example, the audio system 502 may include headsets worn by the crew. As subsequently described in greater detail, engine alerts may also be provided to the crew with the audio system 502.

Figure 6:
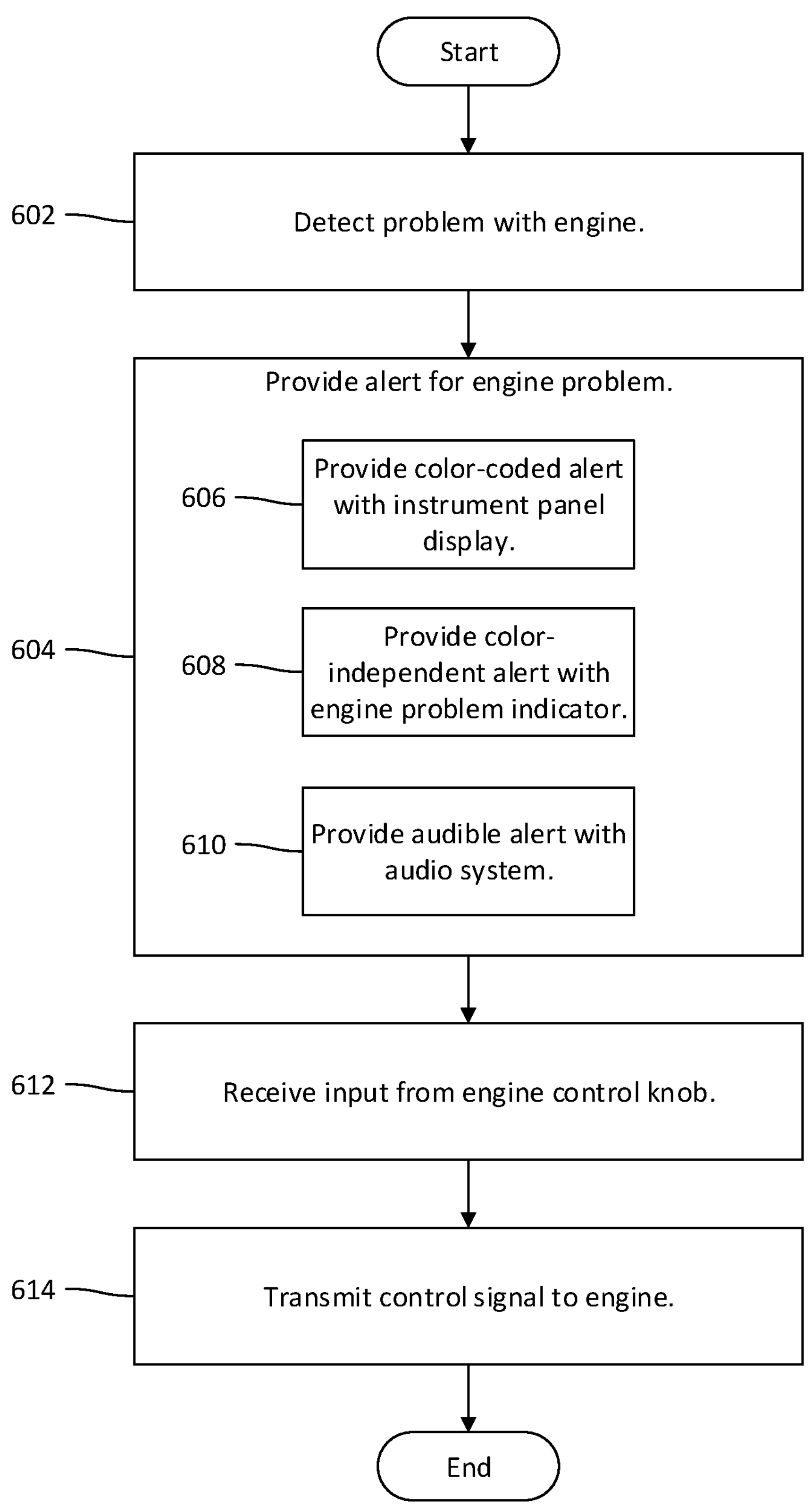
FIG. 6 is a diagram of a method of controlling rotorcraft engines, according to some embodiments.

FIG. 6 is a diagram of a method of controlling the engines 112 of the rotorcraft 100, according to some embodiments. The method of FIG. 6 May be perform by the rotorcraft controller 126.

In step 602, a problem is detected with an engine 112 of the rotorcraft. Detecting the problem may include receiving a signal from the engine control computer for the engine 112, where the signal indicates a problem with the engine 112. For example, when an engine 112 detects the presence of excessive metal chips or a fire, the engine 112 may transmit a signal indicating such a problem to the rotorcraft controller 126.

In step 604, an engine alert for the problem is provided. The engine alert may first be generated, such as by determining which engine 112 a signal was received from, and what the signal indicates. The engine alert is provided with multiple visual indicators, and may also be provided with an audible indicator.

In step 606, the engine alert is provided with the displays 204 of the instrument panel. Providing the engine alert with the displays 204 includes rendering color-coded text in an appropriate location on the displays 204. The engine alert provided with the displays 204 is detailed, including what problem was detected, which engine 112 the problem was detected with, and the severity of the problem. The engine alert is rendered on the displays 204 using different colors based on the severity of the engine alert. For example, advisory engine alerts may be provided by rendering text in black on the displays 204, cautionary engine alerts may be provided by rendering text in yellow on the displays 204, and critical engine alerts may be provided by rendering text in red on the displays 204. In this context, text is rendered in a particular color when that color is the dominant color in the rendered content. For example, rendering text in black may include rendering white text on a black background, rendering text in yellow may include rendering black text on a yellow background, and rendering text in red may include rendering white text on a red background.

In step 608, the engine alert is provided with the alert indicator 306 for the problematic engine 112. Providing the engine alert with the alert indicator 306 includes illuminating the alert indicator 306, which is color-independent. The engine alert provided with the alert indicator 306 is simpler (e.g., less detailed) than the engine alert provided with the displays 204. Specifically, the alert indicator 306 is simply turned on, regardless of the severity of the engine alert. The same color is used to provide advisory engine alerts, cautionary engine alerts, and critical engine alerts with the alert indicator 306. For example, advisory engine alerts may be provided by illuminating the alert indicator 306 in white, cautionary engine alerts may be provided by illuminating the alert indicator 306 in white, and critical engine alerts may be provided by illuminating the alert indicator 306 in white. The alert indicator 306 is physically located near the engine control knob 302 for the problematic engine 112. Providing the engine alert with both the displays 204 and the alert indicator 306 provides a mental link for the crew when shutting down the problematic engine 112, thereby decreasing the risk of the crew selecting the wrong engine control knob 302 when responding to the engine alert.

In step 610, the engine alert is provided with the audio system 502. Providing the engine alert with the audio system 502 includes playing an audio alert with the audio system 502. The engine alert played with the audio system 502 may be detailed or simple, depending on the severity of the engine alert. For example, playing a cautionary engine alert may include playing a chime with the audio system 502, while playing a critical engine alert may include playing a verbal announcement with the audio system 502.

In step 612, input from the engine control knob 302 for the problematic engine 112 is received. The input may be a signal from the engine control knob 302 that is received when the crew moves the engine control knob 302.

In step 614, a control signal is transmitted to the problematic engine 112 based on the input from the engine control knob 302. Specifically, the control signal commands the engine 112 to shut down. For example, the engine 112 may be commanded to idle or may be commanded to turn off, based on the position of the corresponding engine control knob 302.

Additional steps may be performed. For example, before the step 602, the alert indicators 306 may be tested. In some embodiments, the alert indicators 306 are tested before operation of the rotorcraft 100, such as during a startup sequence for the rotorcraft 100. Testing the alert indicators 306 may include illuminating each of the alert indicators 306 for a predetermined duration of time. The alert indicators 306 may be illuminated for a long enough duration (e.g., several seconds) that the crew is able to visually verify that each of the alert indicators 306 are functioning.

Embodiments may achieve advantages. Physically locating the alert indicators 306 near their corresponding engine control knobs 302 provides a mental link for the crew when turning off an engine 112, notwithstanding the visual and spatial disconnect between the displays 204 and the control panels 206. Providing an engine alert with the alert indicators 306 in addition to the displays 204 provides a redundant indication for when the crew shuts down an engine 112. Increasing the indication redundancy may reduce the risk of the crew errors, such as shutting down the wrong engine 112 during a high-stress situation.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An aircraft comprising:

a plurality of engines;

a display in a cockpit of the aircraft, the display being polychromatic, the display being in a primary field of view of a pilot of the aircraft;

an engine control panel in the cockpit, the engine control panel disposed on a different surface of the cockpit than the display, wherein the engine control panel is in a secondary field of view of the pilot of the aircraft based on the engine control panel being disposed on the different surface of the cockpit than the display, the secondary field of view being outside of the primary field of view such that the engine control panel and the display are visually and spatially disconnected, the engine control panel comprising engine control knobs and alert indicators, the alert indicators disposed above the engine control knobs, the alert indicators being monochromatic, the alert indicators being different from the display; and a controller configured to:

detect a problem with a first engine of the engines;

generate an alert for the problem based on the problem detected with the first engine; and provide the alert to the pilot with the display and with a first alert indicator of the alert indicators, the first alert indicator being associated with the first engine, wherein the alert is provided to the pilot simultaneously with both the display and the first alert indicator.

2. The aircraft of claim 1, wherein the controller is configured to provide the alert by:

rendering the alert with the display using different colors based on a severity of the alert; and illuminating the first alert indicator in a same color regardless of the severity of the alert.

3. The aircraft of claim 2, wherein the controller is configured to provide the alert by further:

playing an audio alert with an audio system.

4. The aircraft of claim 1, wherein the first alert indicator is disposed nearer to a first engine control knob than to others of the engine control knobs, the first engine control knob being associated with the first engine.

5. The aircraft of claim 1, wherein the engine control panel further comprises engine labels disposed above the engine control knobs.

6. The aircraft of claim 5, wherein the alert indicators are disposed above the engine labels.

7. The aircraft of claim 5, wherein the alert indicators are disposed below the engine labels.

8. The aircraft of claim 1, wherein, based on the alert indicators being disposed above the engine control knobs, the alert indicators remain visible to the pilot when the pilot reaches for one of the engine control knobs.

9. An apparatus comprising:

a display located in a primary field of view of an aircraft pilot, the display configured to render color-coded text based on an engine alert; and an engine control panel disposed below the display, the engine control panel located in a secondary field of view of the aircraft pilot based on the engine control panel being disposed below the display, the secondary field of view being outside of the primary field of view such that the engine control panel and the display are visually and spatially disconnected, the engine control panel comprising:

engine control knobs; and alert indicators above the engine control knobs, the alert indicators configured to be turned on based on the engine alert and simultaneously with the display rendering the color-coded text, the alert indicators comprising light bulbs that, when turned on, emit light in a single color that does not change, the alert indicators being different from the display, the display capable of rendering more colors than the alert indicators.

10. The apparatus of claim 9, wherein the engine control knobs are crank-off-start/idle-fly (COSIF) control knobs.

11. The apparatus of claim 9, wherein the light bulbs are light-emitting diodes.

12. The apparatus of claim 9, wherein the light bulbs, when turned on, emit white light.

13. The apparatus of claim 9, wherein the engine control panel further comprises:

engine labels above the alert indicators.

14. The apparatus of claim 9, wherein the engine control panel further comprises:

engine labels below the alert indicators.

15. A method comprising:

detecting a problem with an engine of an aircraft;

providing an alert for the problem by:

rendering text on a color display of the aircraft using different colors based on a severity of the alert, the color display located in a primary field of view of a pilot of the aircraft; and simultaneously with the rendering of the text on the color display, illuminating an alert indicator of the aircraft in a same color regardless of the severity of the alert, the alert indicator associated with the engine, the alert indicator being different from the color display, the alert indicator located in a secondary field of view of the pilot of the aircraft based on the alert indicator being disposed on a different surface of a cockpit of the aircraft than the color display, the secondary field of view being outside of the primary field of view such that the alert indicator and the color display are visually and spatially disconnected; and receiving input from an engine control knob associated with the engine; and transmitting a control signal to the engine.

16. The method of claim 15, wherein providing the alert for the problem further comprises:

playing an audio alert with an audio system of the aircraft.

17. The method of claim 15, wherein the text is rendered in black when the alert is an advisory alert, the text is rendered in yellow when the alert is a cautionary alert, and the text is rendered in red when the alert is a critical alert.

18. The method of claim 15, wherein the alert indicator is illuminated in white when the alert is an advisory alert, the alert indicator is illuminated in white when the alert is a cautionary alert, and the alert indicator is illuminated in white when the alert is a critical alert.

19. The method of claim 15, wherein the engine control knob is one of a plurality of engine control knobs, and the alert indicator is disposed nearer to the engine control knob than to others of the engine control knobs.

20. The method of claim 15, wherein the alert indicator is one of a plurality of alert indicators, and the method further comprises:

before operation of the aircraft, testing the alert indicators by illuminating each of the alert indicators for a predetermined duration of time.

* * * * *